US006971586B2

(12) United States Patent
Fisher

(10) Patent No.: US 6,971,586 B2
(45) Date of Patent: Dec. 6, 2005

(54) WATER WALL ASSEMBLY FOR GENERATING DYNAMICALLY CHANGING WATER PATTERNS

(76) Inventor: Gary Randolph Fisher, 2240 Federal Ave., Los Angeles, CA (US) 90064

( * ) Notice: Subject to any disclaimer, the term of this patent is extended or adjusted under 35 U.S.C. 154(b) by 195 days.

(21) Appl. No.: 10/693,591

(22) Filed: Oct. 24, 2003

(65) Prior Publication Data

US 2004/0112977 A1 Jun. 17, 2004

Related U.S. Application Data

(60) Provisional application No. 60/422,542, filed on Oct. 31, 2002.

(51) Int. Cl.[7] .......................... G03B 9/20; B05B 17/08; B05B 1/00; F21S 8/00

(52) U.S. Cl. ............................ 239/17; 239/16; 239/18; 239/23; 239/211

(58) Field of Search .............................. 239/16, 17, 18, 239/19, 20, 21, 22, 23, 211, 12

(56) References Cited

U.S. PATENT DOCUMENTS 6,152,381 A * 11/2000 Hones ......................... 239/17
6,279,835 B1 * 8/2001 Hansen ........................ 239/20
6,382,520 B1 * 5/2002 Hones .......................... 239/12
6,447,137 B1 * 9/2002 Long ........................... 362/96

* cited by examiner

*Primary Examiner*—Davis Hwu

(57) ABSTRACT

A vertical water wall assembly (100) for generating dynamically changing water patterns in a contained channel (114) behind a viewing surface. The water wall assembly includes a translucent front sheet (110) directed toward a viewing space with a rear side containing a multiplicity of concave depressions (111), and a rear sheet (140) disposed behind and in proximity to the front sheet that in part acts as a contrasting background. The edges of these sheets are sealed (120, 122) and water is made to flow in the space defined between the two sheets, entering at the top of the sheets (135) and exiting at the bottom of the sheets (150). The flow of water into the water wall at the water inlet (125) is time varying and is preferably computer-controlled (190). In operation water flowing in the contained channel (114) of the water wall takes dynamic, chaotic pathways through the multiplicity of concave depressions (111). As individual depressions fill and empty, air bubbles that formerly occupied the depressions propagate down the contained channel. This behavior generates a non-uniform "bubbling" sound in the water wall, while contributing to the overall visual effect of the invention.

17 Claims, 3 Drawing Sheets

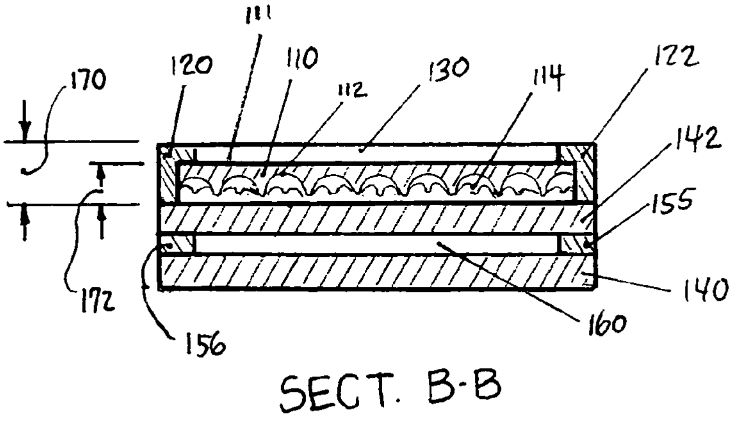
FIG. 3
FIG. 4
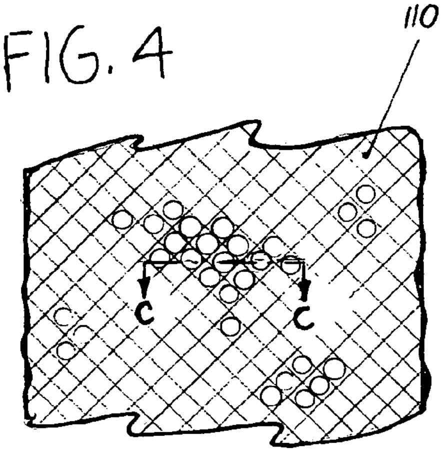
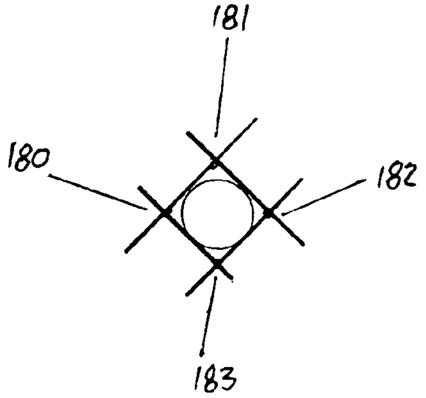
FIG. 6
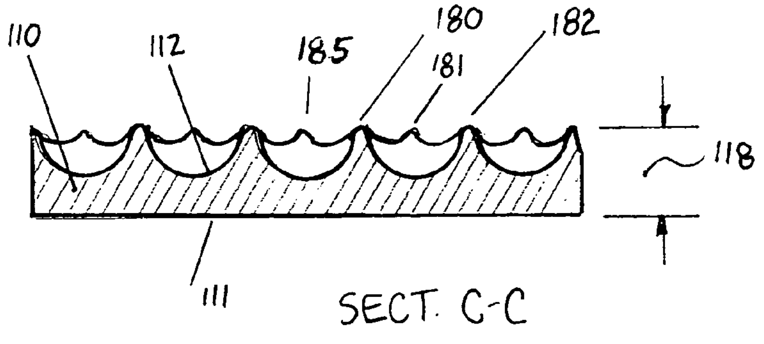
FIG. 5

WATER WALL ASSEMBLY FOR GENERATING DYNAMICALLY CHANGING WATER PATTERNS

CROSS-REFERENCE TO RELATED APPLICATIONS

This application claims priority of provisional application No. 60/422,542, which was filed on Oct. 31, 2002.

BACKGROUND OF THE INVENTION

This invention relates generally to water fountains and particularly to a fountain for generating dynamically changing water patterns.

In the vast majority of prior art water fountains liquid is dispersed over the outer surfaces of fountain elements or streamed via nozzles into the air both with and against gravity. Rarely have water fountains been constructed where the water feature is disposed behind a transparent or translucent surface. As an example of this latter approach Chikazumi (U.S. Pat. No. 5,288,018) teaches a wall fountain with transparent sheets arranged in a zigzag pattern. A series of valves feeding nozzles are turned on and off by a controller to produce a variation of flows constrained by the zigzag sheets. In another example Fuller and Robinson (U.S. Pat. No. 4,715,136) teach a fountain comprised of a transparent plate disposed in opposing relationship to streams of water impinging on the inner surface of the plate; a number of computer controlled proportional valves feeding a number of nozzles provide a kinetic display. Unfortunately, both of these inventions require a complicated and expensive system of valves, nozzles, plumbing and controls to generate a visually dynamic and interesting water display.

BRIEF SUMMARY OF THE INVENTION

It is a primary objective of this invention to provide a fountain wall assembly wherein dynamically changing water patterns are disposed behind a viewing surface without requiring valves and complicated plumbing.

It is a related object of this invention to provide a fountain wall assembly with a translucent viewing sheet whose rear surface is formed with a multiplicity of concave depressions for forming variable pathways for a flow of water.

It is a related object of this invention to provide a fountain wall assembly wherein variations in dynamic water patterns are facilitated by variation of the flow rate of liquid supplied to the wall assembly.

These and other objects of the invention are met by a water wall assembly for generating decorative patterns on the rear of a translucent viewing surface, comprising, a translucent sheet with an essentially planar front surface and a rear surface having a multiplicity of concave depressions;

a backing sheet disposed behind said translucent sheet with means defining a pathway for water to flow in the region between the two sheets from the top of said pathway to an opening in the bottom of said pathway; and supply means for generating a variable flow of liquid to said top of said pathway.

BRIEF DESCRIPTION OF THE DRAWINGS

FIG. 3 is a sectional view taken along line B—B in FIG. 1.

FIG. 4 is a partial front elevation view of the pattern sheet of FIG. 1 taken facing the rear of the pattern sheet and illustrating several pixel-like depressions.

FIG. 5 is an enlarged sectional view of several pixel-like depressions taken along line C—C of FIG. 4.

FIG. 6 is an enlarged plan view of one of the pixel-like depressions in FIG. 5.

DETAILED DESCRIPTION

Figure 1:
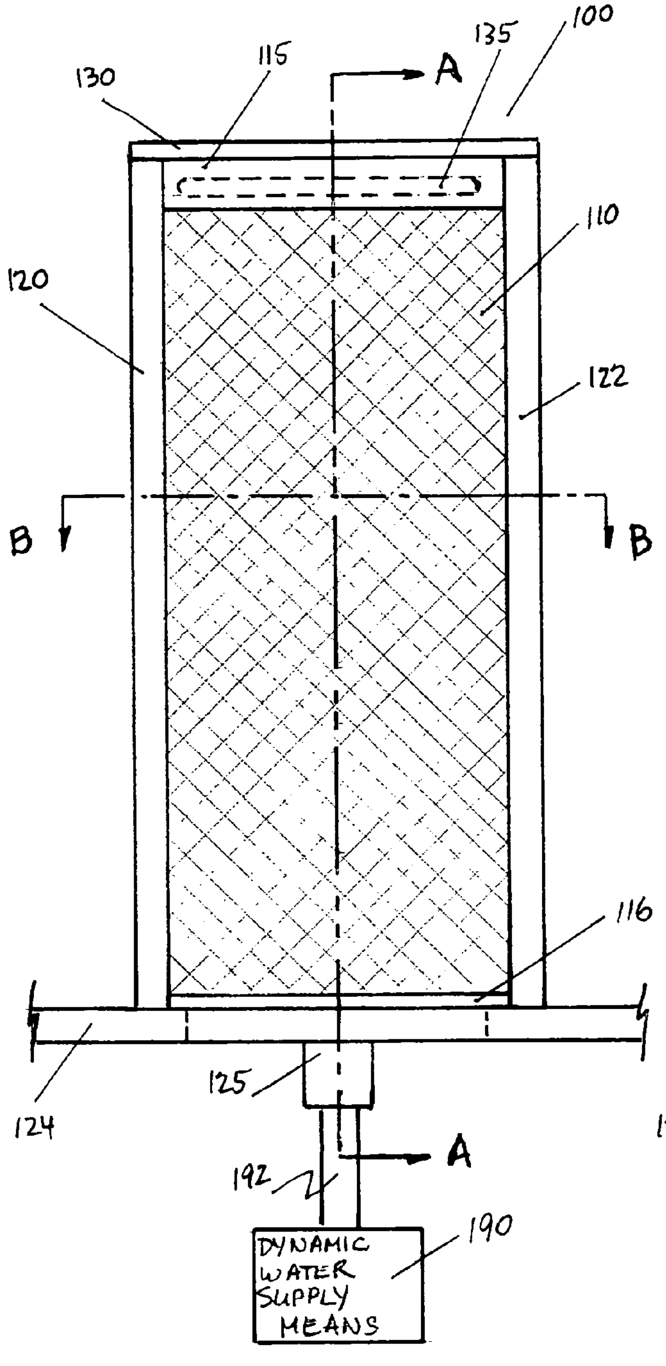
FIG. 1 is a front elevation view of a first embodiment of a water wall assembly according to this invention.
Figure 2:
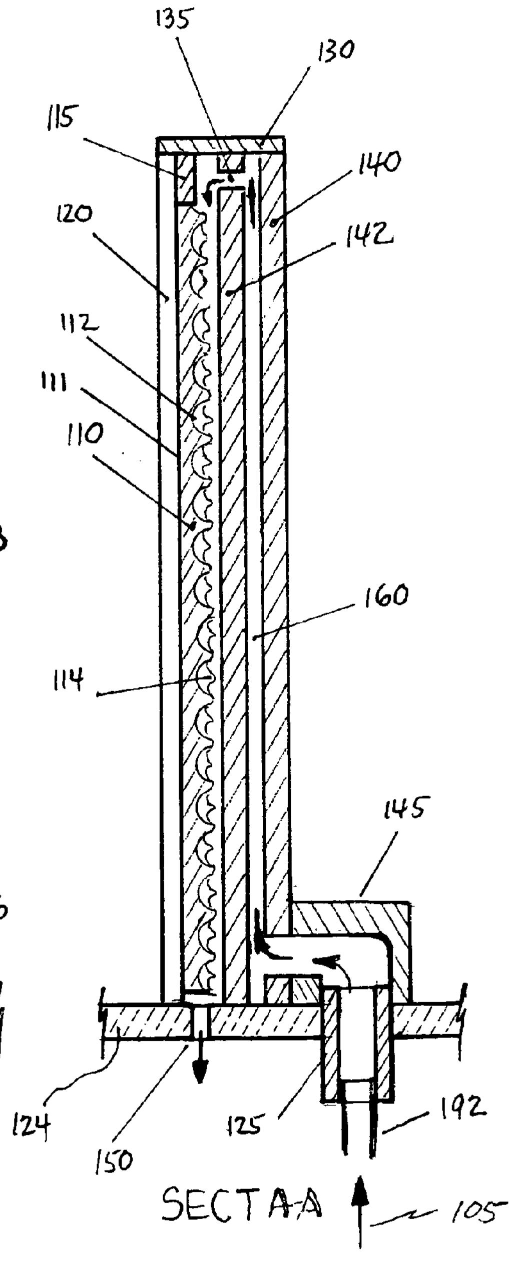
FIG. 2 is a side sectional cutaway view along line A—A in FIG. 1 showing the internal water channels of the first embodiment of the water wall assembly.

FIG. 1 shows a front elevation view of a first embodiment of water wall assembly according to this invention. FIG. 2 shows a side sectional view of the wall assembly taken along line A—A in FIG. 1. By reference to both figures, wall assembly 100 is comprised generally of base plate 124 with water inlet 125, front pattern sheet 110, middle reflecting sheet 142, rear sheet 140, pattern sheet retainers 120 and 122, top outlet cover 115 and top plate 130. Water from dynamic water supply means 190 enters the wall assembly at inlet 125, which is coupled to an opening in rear plate 140 via inlet housing 145. One example of dynamic water supply means 190 is a computer-controlled pump with time varying output flow rate.

FIG. 3 is a sectional view taken along the line B—B in FIG. 1 looking toward the top of wall assembly 100. By reference to FIG. 2 and FIG. 3, rear sheet 140 and middle reflecting sheet 142 define a channel 160 for water to flow from water inlet 125 to the top slot opening 135 in 142. The depth of this channel is defined by the thickness of separator strips 155 and 156 in FIG. 3. For small tabletop fountain displays the depth of channel 160 can be slightly less than the width of pattern sheet 110. Pattern sheet 110 is a transparent or slightly translucent sheet with a planar front surface 111 facing the viewer and a rear surface 112 defined by a plurality of contiguous concave depressions. For different visual effects in terms of the contrast between pattern sheet 110 and middle reflecting sheet 142 when water flows in channel 160, the percentage of light transmission of pattern sheet 110 is preferably between 70% and 100%. Pattern sheet 110 can be cast, extruded or injection molded in acrylic or styrene, or polyester resin as appropriate. The degree of translucency of pattern sheet 110 can be controlled by controlling the surface finish of the mold or die used in its manufacture.

Alternatively, while not shown in the figures, pattern sheet 110 can consist of a transparent front glass plate with a cast plurality of contiguous concave depressions bonded to its rear surface. In this case, the resulting "sandwich" is rigid and will resist buckling when the width and height of the water wall are large.

Middle reflecting sheet 142 is preferably opaque in this embodiment. By reference to FIG. 1 and FIG. 2, pattern sheet 110 has a front planar side, which faces the viewer and a rear patterned side comprised of a multiplicity of pixel-like depressions. As shown in FIG. 3, the planar side of 110 is affixed to the underside of the lips of pattern sheet retainers 120 and 122. The depth 172 of the leg portions of retainers

120 and 122 is preferably slightly greater than the thickness 118 of pattern sheet 100 (see FIG. 5). The resulting channel 114 defined by the region between the front surface of middle reflecting sheet 142 and the rear surface 112 of 110 forms an internal pathway for water exiting top slot 135. This is preferable when the water wall is relatively small—for instance where the width and height of the water wall is less than approximately 16" by 24", respectively. Alternatively, for large water wall assemblies the depth 172 of the leg portions of retainers 120 and 122 is preferably equal to the thickness 118 of pattern sheet 110. In this case the rear or pattern sheet 110 will be in contact with the front surface of middle reflecting sheet 142. Liquid will then be constrained to the valleys in the multiplicity of depressions in pattern sheet 110. In fact to prevent pattern sheet 110 from buckling under water pressure, for example if it is cast in relatively thin acrylic or styrene, it is preferable to fixedly adhere the multiplicity of peaks 180 through 184 (see FIG. 5) to the front surface of middle reflecting sheet 142.

Pattern sheet 110 can better be understood by reference to FIG. 4 through FIG. 6.

FIG. 4 shows a partial front view of a portion of pattern sheet 110 with the pixel-like concave depressions uppermost. These depressions are preferably hemispherical and are oriented at 45-degrees to section line B—B in FIG. 1.

FIG. 5 shows an enlarged sectional view along line C—C of FIG. 4 illustrating several of the pixel-like depressions in cross section.

FIG. 6 is an enlarged plan view of one of these pixel-like depressions in FIG. 5. As shown in FIG. 6 and by reference to FIG. 4, the borders of each contiguous depression with its neighboring depressions form a multiplicity of peaks 180, 181, 182, and 183. These peaks together with their corresponding enclosed depressions form a multiplicity of contiguous "pixels". With sheet 110 as shown in FIG. 4, these "pixels" are analogous to the pixels on a computer screen.

Now consider that a viewer is facing the front planar side of pattern sheet 110 and further consider an arbitrary pixel 185 in 110. If this pixel and the intervening space between the pixel and the front surface of 142 are water filled, the water will act as an index matching fluid; this will allow most of the light incident on front surface 111 of 110 to be transmitted to the front surface of 142 thereby allowing the surface of 142 behind the pixel to show clearly through 110. If on the other hand, there is no water behind the pixel and 142, then more light will be locally scattered and reflected by it than if the region were water filled. The maximum contrast between pixels that are water filled and pixels that are air filled is attained if the front surface of 142 is black and pattern sheet 110 is slightly translucent. Advantageously, the difference in the index of refraction of air and water facilitates the development of a highly decorative dynamic water display.

The operation of wall assembly 100 shall now be discussed. Water from supply means 190 is supplied to inlet 125, flows upward in channel 160, exits through slot opening 135, falls in internal channel 114 and exits at opening 150 in base plate 124. Water can also exit via gap 116 onto base plate 124. As an alternative—not affecting the operation, described below, of the water wall—slot 150 can be sealed. Water will then solely flow over the surface of 124 via opening 116 at the base of 110. A slot can then be provided at an arbitrary location on 124 to facilitate drainage of the base plate or water can be allowed to run over its sides for decorative effect. As another alternative, gap 116 can be closed so that all water exiting the wall now flows through base plate 124 to effect an essentially sealed fountain.

Consider that means 190 outputs water with fixed flow rate f>0. After an initial lag where water fills channel 160, water will begin to flow from slot 135 into channel 114. As it does so, water will displace the air in each of the concave depressions in 110 that it reaches. In fact for any fixed flow rate high enough to allow water to flow from 135, a steady state pattern will develop in channel 114. If f is high enough, water will eventually completely fill channel 114 and all of the depressions ("pixels") in 110.

Now consider that the flow rate from means 190 is made to vary dynamically over time within the range $0 \leqq f < f_{max}$ where $f_{max}$ is such that channel 114 is fully filled in steady state. Each change in flow rate great enough to allow water to flow down 114 causes variation in the filling of channel 114. As this occurs, dynamically changing patterns will evolve over pattern sheet 110. Since water falling down channel 114 instantaneously takes the path of least resistance, the sequence of water paths will be chaotic. The multiplicity of peaks and valleys in the rear surface of 110 contributes to this chaotic effect. Further, the 45-degree orientation of the peaks 180–184 (see FIG. 5) relative to section line D—D in FIG. 1 contributes to this chaotic effect by laterally diverting the downward flow of water.

Advantageously, as supply means volume is varied and individual pixel-like depressions are filled, air bubbles that formerly occupied these depressions are displaced and propagate down channel 114 until they exit the wall. This phenomenon generates a pleasing non-uniform "bubbling" sound while adding to the visual effect of the invention.

Figure 7:
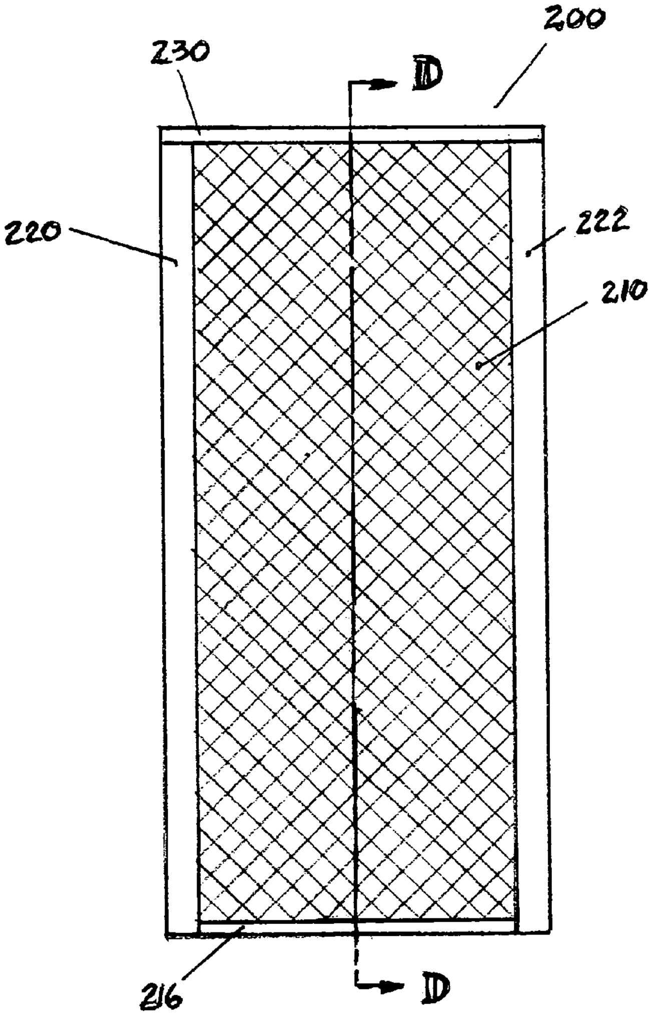
FIG. 7 is a front elevation view of a second embodiment of a water wall assembly according to this invention.
Figure 8:
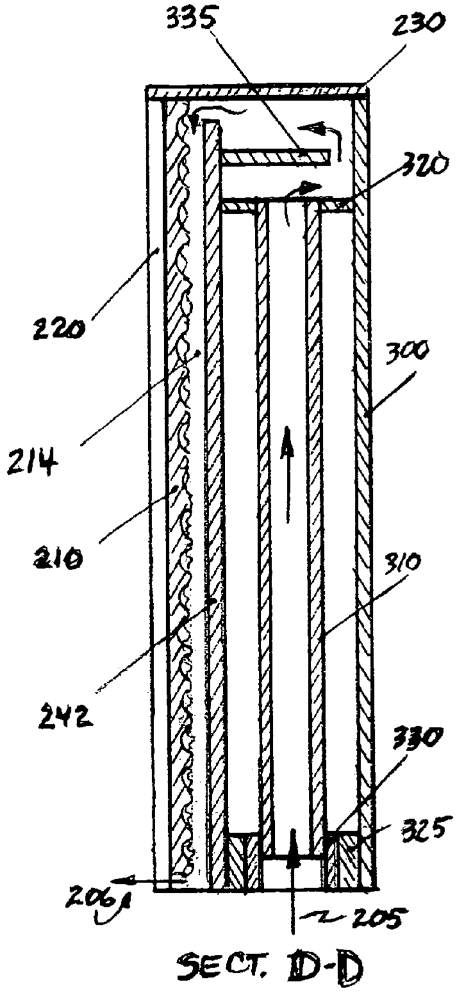
FIG. 8 is a side sectional cutaway view along line D—D in FIG. 7 showing the internal water channels of the second embodiment of the water wall assembly.

FIG. 7 shows a front elevation view of a second embodiment of a water wall assembly 200 according to this invention intended for large fountain displays. FIG. 8 is a side sectional cutaway view along line D—D in FIG. 7 showing the internal water channels of this second embodiment. By reference to FIG. 8, tube 310 communicates with an internal water reservoir which supplies a distributed volume of water to the water wall. This water reservoir is defined by reservoir base 320, rear sheet 300 and middle sheet 242. Water enters the wall assembly via coupling 330 in direction 205 and flows via tube 310 to the reservoir. Diverter plate 335 in the reservoir extends perpendicularly over the outlet of tube 310 to facilitate uniform water distribution along the horizontal extent of the reservoir. The top lip of middle sheet 242 acts as a spillway for water to enter channel 214. For small water walls, the effective width of channel 214 is preferably substantially the same as that of channel 114 in the first embodiment of the invention. For large water walls the rear of pattern sheet 210 is preferably butted against the front of middle reflecting sheet 242 as described in the first embodiment. In this case, liquid will be constrained to the valleys in the multiplicity of depressions in pattern sheet 210.

As in the first embodiment, gap 216 at the base of the water wall can be sealed. Note that in FIG. 8 the base of channel 214 is open, thus allowing liquid to exit downward. By then providing a slotted opening at the base of a floor or support structure on which the water wall is to be installed, the water wall can be made to drain directly to a hidden reservoir not visible to those viewing the water wall. This alternative draining method has no effect on the operation of the water wall of embodiment two, said operation being identical to that of the first embodiment.

Other embodiments and changes to the invention can be considered. First, instead of the hemispherical depressions in pattern sheet 110 as shown in the figures, other arrangements of contiguous or non-contiguous concave depressions could alternatively be specified for pattern sheet 110. For instance a pattern of diamond or cylindrical shaped depressions could be specified. These would change the look of the display when in operation but would not change the basic manner in which the display functions.

Second, although not shown in the figures for the first embodiment of the invention, diverter strips can be variously disposed in channel 160 to modify the distribution of flow across slot 135; this may be desirable when the ratio of the height of pattern sheet 110 to its width is low.

Third, for water walls large in height and width, multiple supply tubes could be disposed along the width of the rear of the wall assembly in the second embodiment to reduce turbulence over that in the case of employing a single tube (310) as shown in FIG. 8.

Fourth, a rear-illuminated embodiment of the invention can be considered. As an example, middle reflecting sheet 142 (242) could be translucent and edge lit. Alternatively, sheets 142 (242) and 140 (300) could be translucent with lighting means suitably disposed to achieve the same effect.

Fifth, a multiplicity of water walls according to this invention can be disposed in a pattern, each driven by separate supply means. Further, these supply means can be synchronized to provide a coordinated display.

Sixth, a wall hanging water wall can be made wherein the operation is identical to embodiments one and two, however having inlet and outlet means that communicate with a reservoir containing pump means. This reservoir can be a structure integral to the rear of the wall in FIGS. 7 and 8. Alternatively, the reservoir can be disposed remotely from where the hanging water wall is to be installed.

Although there has been shown and described hereinabove a specific arrangement of a fountain assembly for generating decorative patterns in accordance with the invention for the purpose or illustrating the manner in which the invention may be used to advantage, it will be appreciated that the invention is not limited thereto. Accordingly, any and all modifications, variations, or equivalent arrangements, which may occur to those skilled in the art, should be considered to be within the scope of the invention.

I claim:

1. A water wall assembly for generating decorative flow patterns, comprising:

a. a translucent front sheet having a substantially planar front side disposed toward a viewing space and having a rear side comprised of a multiplicity of concave depressions, said depressions for providing a patterned viewing screen when viewed from the front of said front sheet, said multiplicity of concave depressions further providing a multiplicity of liquid flow pathways for forming decorative water patterns;

b. a rear sheet disposed behind said front sheet with front side disposed toward said multiplicity of concave depressions, for providing a contrasting background visible through said front sheet;

c. side edge means fixidly disposed at the sides of said front sheet and said rear sheet for holding said front sheet and said rear sheet in fixed relation to one another, wherein said front sheet and said rear sheet are parallel and oriented vertically and wherein the rear side of said front sheet comprised of said multiplicity of concave depressions and the front side of said rear sheet have means defining an irregular channel for the flow of liquid;

d. means defining a first opening at the top of said channel for providing an entry opening for an input flow of liquid into said channel;

e. means defining an second opening at the bottom of said channel for providing an exit opening for an exit flow of liquid from said channel;

f. supply means for generating a variable flow of liquid; and g. delivery means for transporting said variable flow of liquid from said supply means to said first opening at the top of said channel, for providing a variable flow of liquid in said channel of said water wall assembly.

2. The water wall assembly of claim 1, wherein said rear sheet is opaque.

3. The water wall assembly of claim 1, wherein said rear sheet is translucent.

4. The rear sheet of claim 3, wherein said rear sheet is rear illuminated.

5. The water wall assembly of claim 1, wherein said concave depressions are hemispherical.

6. The front sheet of claim 1 wherein said multiplicity of concave depressions are disposed in a grid, wherein each grid element has equal sides.

7. The grid of claim 6, wherein each said grid element is oriented with the vertices of said sides oriented vertically.

8. The water wall assembly of claim 1, wherein the rate of said flow of liquid is time varying between the limits of zero and a maximum defined as the rate of said flow of liquid required to completely fill said channel.

9. The water wall assembly of claim 1, wherein said supply means is a computer-controlled pump.

10. The supply means of claim 1 wherein said flow of liquid is controlled by a pre-programmed computer.

11. The water wall assembly of claim 1, wherein the rear side of said front sheet and the front side of said rear sheet are separated by a distance substantially equivalent to the thickness of said front sheet.

12. The translucent front sheet of claim 1 wherein the percentage of light transmission is between 70% to 100%.

13. The water wall assembly of claim 1, wherein said translucent front sheet is acrylic.

14. The water wall assembly of claim 1, wherein said translucent front sheet is styrene.

15. The water wall assembly of claim 1, wherein said translucent front sheet is polyester resin.

16. The water wall assembly of claim 1, wherein the rear side of said front sheet and the front side of said rear sheet are in substantial and fixed contact.

17. A water wall assembly for generating decorative flow patterns, comprising:

a. a translucent front sheet with an essentially planar front side and a rear side having a multiplicity of concave depressions for providing a multiplicity of liquid flow pathways;

b. a rear sheet disposed behind said translucent front sheet with means defining a pathway for liquid to flow in the region defined between the rear side of said translucent front sheet and the front side of said rear sheet, for providing a contrasting background visible through said front sheet;

c. means defining an opening at the top of said pathway for an input of liquid between the two sheets from the top of said pathway to an opening in the bottom of said pathway;

d. means defining an opening at the bottom of said pathway for an output of liquid; and e. supply means for generating a variable flow of liquid to said top of said pathway.

* * * * *